United States Patent [19]

Klaber

[11] E Re. 30,346

[45] Reissued Jul. 22, 1980

[54] FOLDABLE PEN

[76] Inventor: Michael C. Klaber, 10526 Caminito Obra, San Diego, Calif. 92126

[21] Appl. No.: 42,069

[22] Filed: May 24, 1979

Related U.S. Patent Documents

Reissue of:

[64] Patent No.: 4,081,217
Issued: Mar. 28, 1978
Appl. No.: 726,471
Filed: Sep. 27, 1976

[51] Int. Cl.[2] ..... B43K 23/02; B43K 29/00

[52] U.S. Cl. ..... 401/131; 401/195

[58] Field of Search ..... 401/131, 195, 29, 52, 401/95, 6; 7/16

[56] References Cited

U.S. PATENT DOCUMENTS

| | | | |
|---|---|---|---|
| 2,456,904 | 12/1948 | Wahlstrom | 401/195 X |
| 2,896,576 | 7/1959 | Baer | 401/195 |
| 3,257,991 | 6/1966 | Mosch | 401/29 |

*Primary Examiner*—Stephen C. Pellegrino
*Attorney, Agent, or Firm*—Henri J. A. Charmasson

[57] ABSTRACT

A foldable pen having a pair of pivotally connected elongated members, one of which having a writing nib projecting from an end portion. Latches are disposed within the elongated members to maintain the pen in an opened writing position or in a closed position. In the closed position, an extension of the other member engages with the nib to form a carrying loop.

6 Claims, 3 Drawing Figures

FOLDABLE PEN

Matter enclosed in heavy brackets [ ] appears in the original patent but forms no part of this reissue specification; matter printed in italics indicates the additions made by reissue.

*PRIOR APPLICATION*

*This is an application for reissue of U.S. Pat. No. 4,081,217 issued Mar. 28, 1978.*

BACKGROUND OF THE INVENTION

The present invention relates to a foldable pens or like writing instruments.

Foldable pens are known in the prior art, but none of these were designed to form a carrying loop from the members comprising the pen when the pen is folded to the closed [position] *positions*. Some of these prior art devices are disclosed in U.S. Pat. Nos. 1,561,262; 2,896,576; 3,257,991 and 3,407,021.

SUMMARY OF THE INVENTION

It is the principal object of this invention to provide a foldable pen that may be latched in an opened or closed position and, when closed, form a loop for carrying on a key ring or the like.

These and other objects are achieved by the preferred embodiment of the present invention which comprises two pivotally connected elongated members. A detent prong formed in the end of one member snaps into an aligned aperture in the other member to hold the pen open for writing. A manually releasable latch holds the pen in the closed position. When closed, the nib positioned at the free end of one member, is covered by a resilient member projecting from a free end of the other member to form a continuous loop for carrying.

Having in mind the above and other objects that will be obvious from an understanding of the disclosure, the present invention comprises a combination and arrangement of parts illustrated in the presently preferred embodiments of the invention which are hereinafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described, by way of example, with reference to the accompanying drawing, in which.

DETAILED DESCRIPTION OF THE INVENTION

Figure 1:
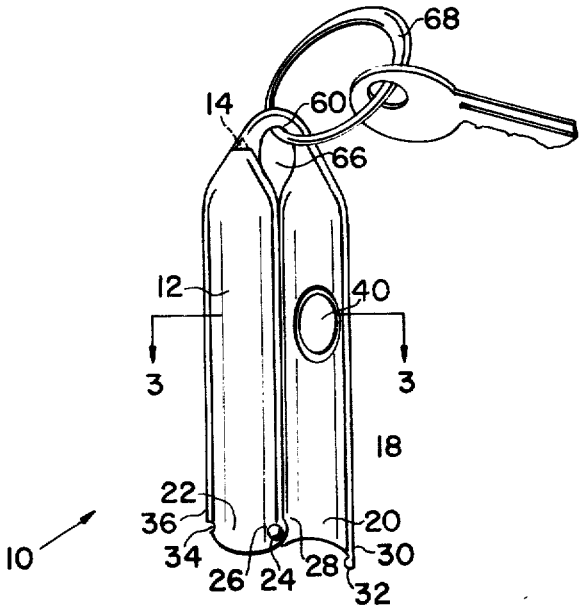
FIG. 1 is a frontal view of the preferred embodiment utilizing the principles of the present invention and shown in the closed position.
Figure 2:
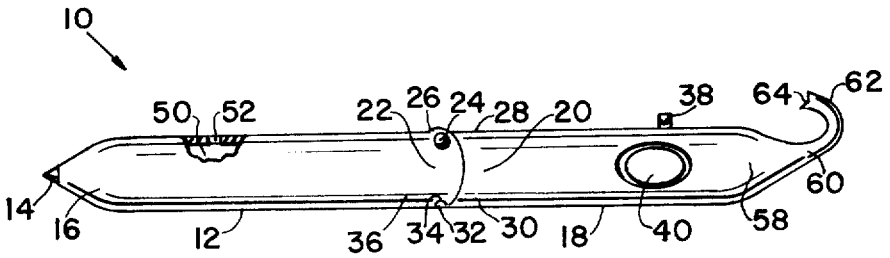
FIG. 2 is a frontal view of the pen shown in an opened position.
Figure 3:
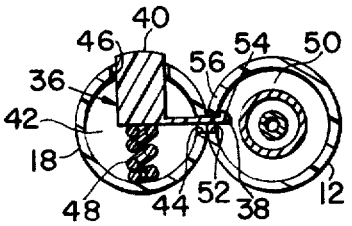
FIG. 3 is a sectional view taken along line 3—3 in FIG. 1.

Referring to FIGS. 1 and 2 of the drawing and in accordance with the principles of the invention, a foldable pen 10 is shown. The pen 10, made of plastic or steel, comprises a first elongated member 12 having a writing nib 14 extending from one end 16 thereof and a second elongated member 18 connected at one end 20 to the other end 22 of the first member with a pivot pin 24. The pivot pin 24 is positioned at corresponding the peripheral edges 26, 28 of the first and second members 12, 18, respectively.

Projecting from a second peripheral edge 30 of the second member 18 opposite the first edge 28 is an integral detenting prong 32 that will detent into an aperture 34 located in the first member 12 at a corresponding peripheral edge 36. The engagement of the prong 32 into the aperture 34 maintains the pen 10 in an opened writing position. Manual folding pressure can snap the prong 32 from the aperture 34 when closing the pen 10.

To maintain the pen 10 in the closed position, a latching member 36 comprising a hooking portion 38 and an integral plunger portion 40 disposed at right angles to each other is employed. The latching member 36 is located within a hollow portion 42 of the second member. The hooking portion 38 projects outwardly through a first aperture 44 and the plunger portion 40 projects outwardly through a second aperture 46 disposed at 90° with respect to the first aperture 44. Both apertures 44, 46, open into the hollow portion 42. A biasing spring 48 outwardly biases the plunger 40.

The first member 12 also has a hollow portion 50 located therein and an aperture 52 opens into the hollow portion 50 and is aligned with the hooking portion 38. When closing the pen 10, the hooking portion 38 enters the aperture 52 and hooks to an edge thereof. The direction of the force exerted by the biasing spring 48 urges the tapered tab 54 of the hooking portion over the wall 56 of the first member 12 to maintain the pen 10 in the closed position. By manual depression of the plunger 40, the tab 54 is released from the edge of the aperture 52 and the pen 10 may be opened.

Extending from the other end 58 of the second member 18 is and integral therewith a curved resilient member 60. The free end 62 of this member 60 has a depression 64 formed therein receptive of the nib 14 of the pen 10. The nib 14 engages the depression 64 by a detenting action to form a loop comprised of the elongated members 12, 18 and the resilient member 60. The opening 66 formed is receptive of a key ring 68 or the like.

While preferred and other exemplary embodiments of the invention are illustrated, it will be understood that the invention is in no way limited to these embodiments.

What is claimed is:

1. A foldable pen or like writing instrument comprising a first elongated member having a writing nib extending from a first end thereof, a second elongated member pivotally connected at a first end thereof to a second end of said first elongated member and capable of being rotated from an opened writing position wherein said elongated members are disposed substantially coaxially with one another to a closed position wherein said members are disposed parallel and alongside each other, means for releasably locking said pen in said opened position, means for releasably locking said pen in said closed position, loop forming means affixed to a second end of said second elongated member and having means for connecting to said nib to form a continuous loop when said pen is in the closed position, wherein said elongated members are pivotally connected at first corresponding peripheral edges thereof and wherein said means for releasably locking said pen in the opened position includes a resilient detenting prong disposed at a second peripheral edge of said second elongated member and projecting therefrom, said second edge disposed opposite said first edge, and means defining an aperture formed near a second peripheral edge of said first member, said edge corresponding to said second edge of said second member and said aperture receptive of said detenting prong when the pen is rotated into the fully opened position thereby retaining the pen in the opened position.

2. The pen as recited in claim 1, wherein said detenting prong is integral with said second member.

3. The pen as recited in claim 1, wherein said first and second portions include means defining hollow portions therein and wherein said means for locking said pen in the closed position comprises means defining a first aperture through the wall of said second member at a point on the surface thereof adjacent to said second member and opening into said hollow portion, means defining a second aperture through the wall of said second member disposed at approximately 90° from said first aperture and opening into said hollow portion, a latching member having a hooked portion and a plunger portion integral therewith and disposed 90° therefrom, said latching member positioned within said hollow portion of said second member with the hooked portion projecting outwardly through said first aperture and the plunger portion projecting outwardly through said second aperture, means for outwardly biasing said plunger portion, means defining an aperture through the wall of said first member at a point corresponding to said first aperture in said second member, said aperture opening into said hollow portion and receptive of said hooked portion of the latching member when said pen is in the closed position, said biasing means urging said hooked portion into locking engagement with an edge of the aperture thereby locking the pen in the opened position whereby depression of the plunger disengages said hooked portion from said edge.

4. The pen as recited in claim 3, wherein said loop forming means comprises a curved resilient member affixed to a second end of said second elongated member at one end and having a depression formed into the other end for receiving the nib of said pen in detent engagement.

5. The pen as recited in claim 4, wherein said curved resilient member is integral with said second member.

*6. A foldable pen or like writing instrument comprising:*

*a first elongated member having a writing nib extending from a first end thereof;*

*a second elongated member pivotally connected at a first end thereof to a second end of said first elongated member and capable of being rotated from an opened writing position wherein said elongated members are disposed substantially coaxially with one another to a closed position wherein said members are disposed parallel and alongside each other;*

*means for releasable locking said pen in said open position,*

*means for releasably locking said pen in said closed position; and*

*an extension projecting laterally from said second end of said second elongated member toward the location of the first end of said first elongated member when the foldable pen is in the closed position, said extension having means for contacting with said first end leaving a gap large enough to be engaged by a keyring between said first and second members whereby the projecting extension, the first member and the second member form a closed loop around said gap which may be interlocked with said keyring.*

* * * * *